United States Patent
Sze et al.

(10) Patent No.: US 11,606,580 B2
(45) Date of Patent: *Mar. 14, 2023

(54) SAMPLE ADAPTIVE OFFSET (SAO) PARAMETER SIGNALING

(71) Applicant: TEXAS INSTRUMENTS INCORPORATED, Dallas, TX (US)

(72) Inventors: Vivienne Sze, Cambridge, MA (US); Madhukar Budagavi, Plano, TX (US); Woo-Shik Kim, San Diego, CA (US); Do-Kyoung Kwon, Allen, TX (US); Minhua Zhou, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,044

(22) Filed: Apr. 28, 2021

(65) Prior Publication Data
US 2021/0266606 A1  Aug. 26, 2021

Related U.S. Application Data

(63) Continuation of application No. 16/741,611, filed on Jan. 13, 2020, now Pat. No. 11,025,960, which is a
(Continued)

(51) Int. Cl.
*H04N 19/00* (2014.01)
*H04N 19/86* (2014.01)
(Continued)

(52) U.S. Cl.
CPC .......... *H04N 19/86* (2014.11); *H04N 19/117* (2014.11); *H04N 19/463* (2014.11); *H04N 19/70* (2014.11);
(Continued)

(58) Field of Classification Search
CPC ........ H04N 19/91; H04N 19/86; H04N 19/80; H04N 19/70; H04N 19/463; H04N 19/117; H04N 19/82
See application file for complete search history.

(56) References Cited

U.S. PATENT DOCUMENTS

| 2008/0013633 | A1* | 1/2008 | Ye ........................ H04N 19/174 375/240.24 |
| 2012/0106624 | A1 | 5/2012 | Huang et al. |

(Continued)

FOREIGN PATENT DOCUMENTS

| WO | 2012092841 A1 | 7/2012 |
| WO | 2012142966 A1 | 10/2012 |

OTHER PUBLICATIONS

Ken McCann et al, "Samsung's Response to the Call for Proposals on Video Compression Technology", JCTVC-A124, Joint Collaborative Team on Video Coding (JCT-VC) of ITU-T SG16 WP3 and ISO/IEC JTC1/SC29/WG11, pp. 1-40, Apr. 15-23, 2010, Dresden, Germany.

(Continued)

*Primary Examiner* — Zhihan Zhou
(74) *Attorney, Agent, or Firm* — Carl G. Peterson; Frank D. Cimino

(57) ABSTRACT

A method for sample adaptive offset (SAO) filtering and SAO parameter signaling in a video encoder is provided that includes determining SAO parameters for largest coding units (LCUs) of a reconstructed picture, wherein the SAO parameters include an indicator of an SAO filter type and a plurality of SAO offsets, applying SAO filtering to the reconstructed picture according to the SAO parameters, and entropy encoding LCU specific SAO information for each LCU of the reconstructed picture in an encoded video bit stream, wherein the entropy encoded LCU specific SAO information for the LCUs is interleaved with entropy
(Continued)

encoded data for the LCUs in the encoded video bit stream. Determining SAO parameters may include determining the LCU specific SAO information to be entropy encoded for each LCU according to an SAO prediction protocol.

13 Claims, 6 Drawing Sheets

Related U.S. Application Data continuation of application No. 16/056,215, filed on Aug. 6, 2018, now Pat. No. 10,536,722, which is a continuation of application No. 13/593,973, filed on Aug. 24, 2012, now Pat. No. 10,070,152.

(60) Provisional application No. 61/577,969, filed on Dec. 20, 2011, provisional application No. 61/526,931, filed on Aug. 24, 2011.

(51) Int. Cl.
*H04N 19/70* (2014.01)
*H04N 19/117* (2014.01)
*H04N 19/463* (2014.01)
*H04N 19/82* (2014.01)
*H04N 19/80* (2014.01)
*H04N 19/91* (2014.01)

(52) U.S. Cl.
CPC ............. *H04N 19/80* (2014.11); *H04N 19/82* (2014.11); *H04N 19/91* (2014.11)

(56) References Cited

U.S. PATENT DOCUMENTS

| | | | | |
|---|---|---|---|---|
| 2012/0177107 A1* | 7/2012 | Fu | ................ | H04N 19/61 375/240.03 |
| 2012/0294353 A1* | 11/2012 | Fu | ................ | H04N 19/176 375/240.02 |
| 2012/0327999 A1* | 12/2012 | Francois | ................ | H04N 19/11 375/240.02 |
| 2013/0215959 A1* | 8/2013 | Chen | ................ | H04N 19/82 375/240.02 |
| 2013/0259118 A1* | 10/2013 | Fu | ................ | H04N 19/177 375/240.02 |

OTHER PUBLICATIONS

Yu-Wen Huang et al., "In-Loop Adaptive Restoration", JCTVC-B077, Joint Collaborative Team on Video Coding (JCT-VC) of ITU-T SG16 WP3 and ISO/IEC JTC1/SC29/WG11, pp. 1-11, Jul. 21-28, 2010, Geneva, Switzerland.

Chih-Ming Fu et al., "TE10 Subtest 3: Quadtree-Based Adaptive Offset", JCTVC-C147, Joint Collaborative Team on Video Coding (JCT-VC) of ITU-T SG16 WP3 and ISO/IEC JTC1/SC29/WG11, pp. 1-6, Oct. 7-15, 2010, Guangzhou, China.

Chih-Ming Fu et al, "CE8 Subset3: Picture Quadtree Adaptive Offset", JCTVC-D122, Joint Collaborative Team on Video Coding (JCT-VC) of ITU-T SG16 WP3 and ISO/IEC JTC1/SC29/WG11, pp. 1-10, Jan. 20-28, 2011, Daegu, Korea.

Chih-Ming Fu et al, "CE8 Subset3: Picture Quadtree Adaptive Offset", JCTVC-D122 Presentation, Joint Collaborative Team on Video Coding (JCT-VC) of ITU-T SG16 WP3 and ISO/IEC JTC1/SC29/WG11, pp. 1-9, Jan. 20-28, 2011, Daegu, Korea.

Chih-Ming Fu et al, "CE13: Sample Adaptive Offset with LCU-Independent Decoding", JCTVC-E049, Joint Collaborative Team on Video Coding (JCT-VC) of ITU-T SG16 WP3 and ISO/IEC JTC1/SC29/WG11, pp. 1-6, Mar. 16-23, 2011, Geneva, Switzerland.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Chin-Ming Fu et al, "Sample Adaptive Offset with LCU-Based Syntax", JCTVC-F056, Joint Collaborative Team on Video Coding (JCT-VC) of ITU-T SG16 WP3 and ISO/IEC JTC1/SC29/WG11, pp. 1-6, Jul. 14-22, 2011, Torino, Italy.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-229, Jul. 14-22, 2011, Torino, Italy.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-260, Jul. 11-20, 2012, Stockholm, Sweden.

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/WG11, pp. 1-272, Apr. 27-May 7, 2012, Geneva, Switzerland.

Chih-Ming Fu et a., "Sample Adaptive Offset for HEVC", 2011 IEEE 13th International Workshop on Multimedia Signal Processing (MMSP), pp. 1-5, Oct. 17-29, 2011, Hangzhou, China.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-237, Nov. 21-30, 2011, Geneva, Switzerland.

Chih-Ming Fu, "CE8.a.3: SAO with LCU-Dased Syntax", JCTVC-H0273, Joint Collaborative Team on Video Coding (JCT-VC) of ITU-T SG16 WP3 and ISO/IEC JTC1/SC29/WG11, pp. 1-8, Feb. 1-10, 2012, San Jose, CA.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-259, Nov. 21-30, 2011, Geneva, Switzerland.

TMS320DM6467 Digital Media System-on-Chip, SPRS403G, Texas Instruments Incorporated, Dec. 2007, revised Oct. 2010, pp. 1-355.

* cited by examiner

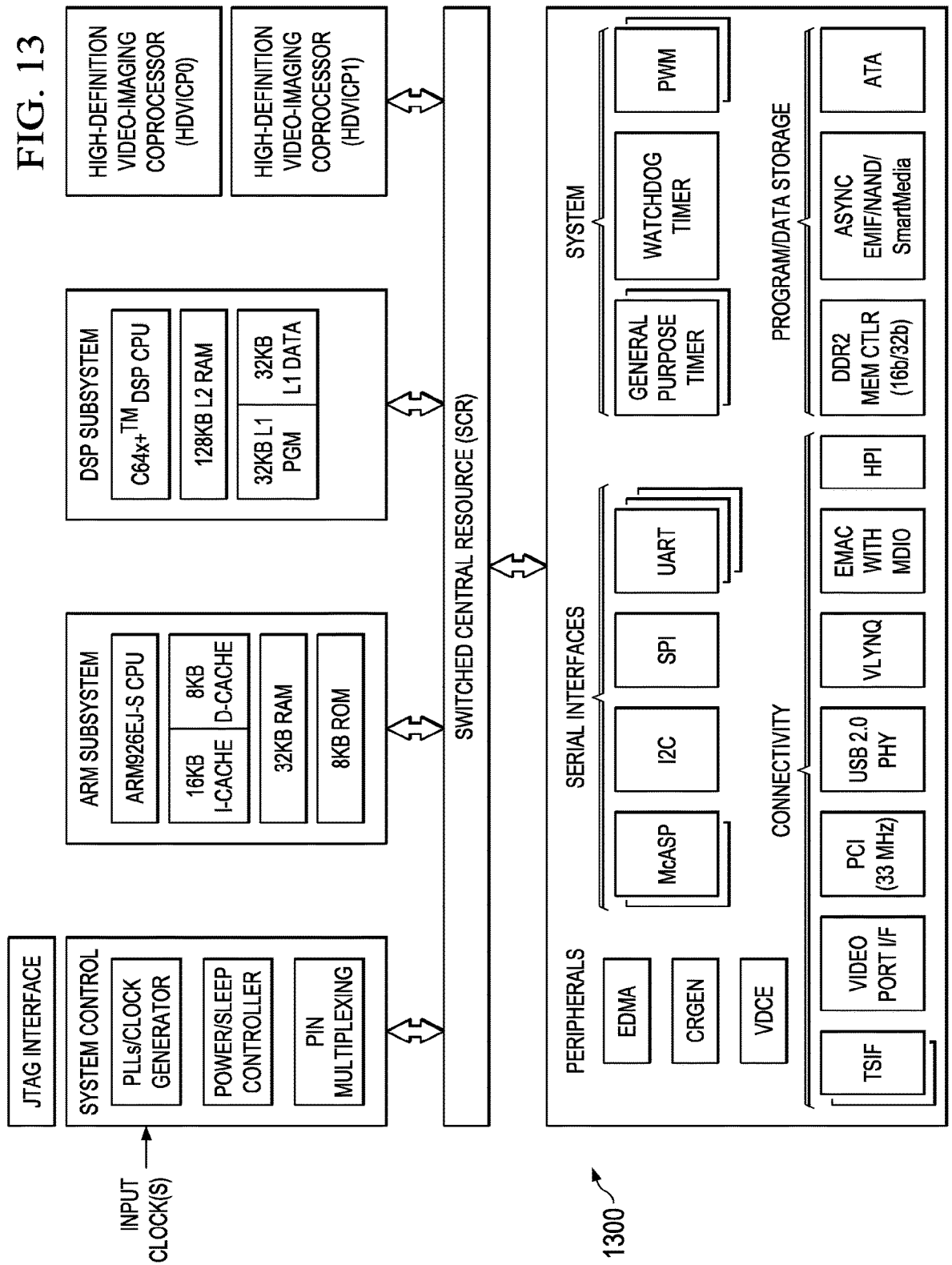

SAMPLE ADAPTIVE OFFSET (SAO) PARAMETER SIGNALING

CROSS-REFERENCE TO RELATED APPLICATIONS

This application is a continuation of U.S. patent application Ser. No. 16/741,611, filed Jan. 13, 2020, which is a continuation of U.S. patent application Ser. No. 16/056,215, filed Aug. 6, 2018, (now U.S. Pat. No. 10,536,722), which is a continuation of U.S. patent application Ser. No. 13/593,973 filed Aug. 24, 2012, (now U.S. Pat. No. 10,070,152), which claims the benefit of U.S. Provisional Patent Application No. 61/526,931, filed Aug. 24, 2011, and U.S. Provisional Patent Application No. 61/577,969, filed Dec. 20, 2011, both of which are incorporated herein by reference in their entirety. This application is related to application Ser. No. 14/338,693, filed Jul. 23, 2014 (now U.S. Pat. No. 8,923,407) which is incorporated herein by reference in its entirety.

BACKGROUND OF THE INVENTION

Field of the Invention

Embodiments of the present invention generally relate to sample adaptive offset (SAO) parameter signaling in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients. While H.264/AVC divides a picture into fixed size macroblocks of 16×16 samples, HEVC divides a picture into largest coding units (LCUs), of 16×16, 32×32 or 64×64 samples. The LCUs may be further divided into smaller blocks, i.e., coding units (CU), using a quad-tree structure. A CU may be split further into prediction units (PUs) and transform units (TUs). The size of the transforms used in prediction error coding can vary from 4×4 to 32×32 samples, thus allowing larger transforms than in H.264/AVC, which uses 4×4 and 8×8 transforms. As the optimal size of the above mentioned blocks typically depends on the picture content, the reconstructed picture is composed of blocks of various sizes, each block being coded using an individual prediction mode and the prediction error transform.

In a coding scheme that uses block-based prediction, transform coding, and quantization, some characteristics of the compressed video data may differ from the original video data. For example, discontinuities referred to as blocking artifacts can occur in the reconstructed signal at block boundaries. Further, the intensity of the compressed video data may be shifted. Such intensity shift may also cause visual impairments or artifacts. To help reduce such artifacts in decompressed video, the emerging HEVC standard defines three in-loop filters: a deblocking filter to reduce blocking artifacts, a sample adaptive offset filter (SAO) to reduce distortion caused by intensity shift, and an adaptive loop filter (ALF) to minimize the mean squared error (MSE) between reconstructed video and original video. These filters may be applied sequentially, and, depending on the configuration, the SAO and ALF loop filters may be applied to the output of the deblocking filter.

SUMMARY

Embodiments of the present invention relate to methods, apparatus, and computer readable media for sample adaptive offset (SAO) filtering and SAO parameter signaling. In one aspect, a method for sample adaptive offset (SAO) filtering and SAO parameter signaling in a video encoder is provided that includes determining SAO parameters for largest coding units (LCUs) of a reconstructed picture, wherein the SAO parameters include an indicator of an SAO filter type and a plurality of SAO offsets, applying SAO filtering to the reconstructed picture according to the SAO parameters, and entropy encoding LCU specific SAO information for each LCU of the reconstructed picture in an encoded video bit stream, wherein the encoded LCU specific SAO information for the LCUs is interleaved with entropy encoded data for the LCUs in the encoded video bit stream. Determining SAO parameters may include determining the LCU specific SAO information to be entropy encoded for each LCU according to an SAO prediction protocol.

In one aspect, a method for sample adaptive offset (SAO) filtering in a video decoder is provided that includes entropy decoding LCU specific SAO information for an LCU from an encoded video bit stream, determining SAO parameters for the LCU from the LCU specific SAO information, and applying SAO filtering to the reconstructed picture according to the SAO parameters, wherein encoded LCU specific SAO information for LCUs of a picture is interleaved with entropy encoded data for the LCUs in the encoded video bit stream. Determining SAO parameters may include determining values of the SAO parameters from the LCU specific SAO information for the LCU according to an SAO prediction protocol.

BRIEF DESCRIPTION OF THE DRAWINGS

Particular embodiments will now be described, by way of example only, and with reference to the accompanying drawings:

FIG. 13 is a block diagram of an illustrative digital system.

DETAILED DESCRIPTION OF EMBODIMENTS OF THE INVENTION

Figure 1:
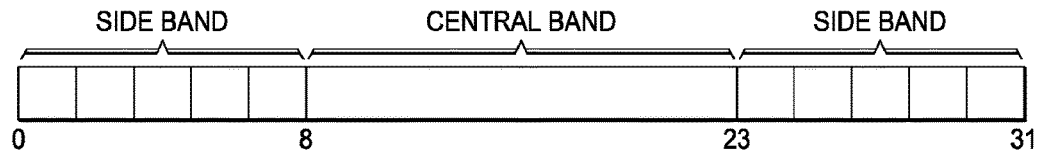
FIG. 1 illustrates band offset (BO) classification in sample adaptive offset (SAO) filtering.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, March 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, April 17-May 7, 2012 ("HEVC Draft 7"), and B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8").

As previously mentioned, a sample adaptive offset (SAO) in-loop filter is one of the in-loop filters included in the emerging HEVC standard. These in-loop filters are applied in the encoder and the decoder. SAO may be applied to reconstructed pixels after application of a deblocking filter. In general, SAO involves adding an offset to compensate for intensity shift directly to a reconstructed pixel. The value of the offset depends on the local characteristics surrounding the pixel, i.e., edge direction/shape and/or pixel intensity level. There are two techniques used for determining offset values: band offset (BO) and edge offset (EO). In previous HEVC specifications, e.g., WD4 and WD5, for purposes of SAO, seven SAO filter types are defined: two types of BO, four types of EO, and one type for no SAO. These types are described in more detail below.

The encoder divides a reconstructed picture into LCU-aligned regions according to a top-down quadtree partitioning and decides which of the SAO filter types is to be used for each region. Each region in a partitioning contains one or more LCUs. More specifically, the encoder decides the best LCU quadtree partitioning and the SAO filter type and associated offsets for each region based on a rate distortion technique that estimates the coding cost resulting from the use of each SAO filter type. For each possible region partitioning, the encoder estimates the coding costs of the SAO parameters, e.g., the SAO filter type and SAO offsets, resulting from using each of the predefined SAO filter types for each region, selects the SAO filter type with the lowest cost for the region, and estimates an aggregate coding cost for the partitioning from the region coding costs. The partitioning with the lowest aggregate cost is selected for the picture.

For BO, the pixels of a region are classified into multiple bands where each band contains pixels in the same intensity interval. That is, the intensity range is equally divided into 32 bands from zero to the maximum intensity value (e.g., 255 for 8-bit pixels). Based on the observation that an offset tends to become zero when the number of pixels in a band is large, especially for central bands, the 32 bands are divided into two groups, the central 16 bands and two side bands as shown in FIG. 1. Each pixel in a region is classified according to its intensity into one of two categories: the side band group or the central band group. The five most significant bits of a pixel are used as the band index for purposes of classification. An offset is also determined for each band of the central group and each band of the side band group. The offset for a band may be computed as an average of the differences between the original pixel values and the reconstructed pixel values of the pixels in the region classified into the band.

Figure 2A:
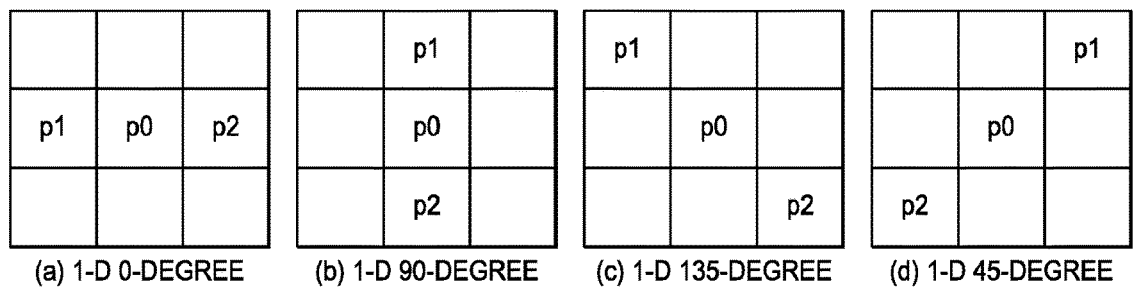
FIG. 2A illustrates edge offset (EO) classification patterns in SAO filtering.
Figure 2B:
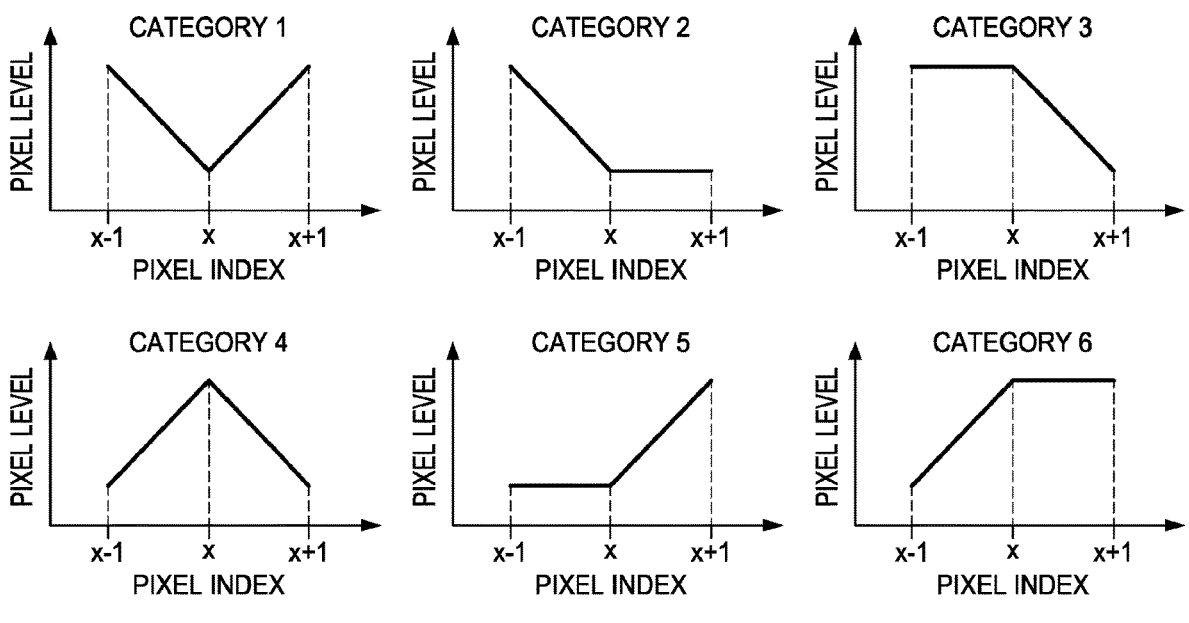
FIG. 2B illustrates edge types by EO category.

For EO, pixels in a region are classified based on a one dimensional (1-D) delta calculation. That is, the pixels can be filtered in one of four edge directions (0, 90, 135, and 45) as shown in FIG. 2A. For each edge direction, a pixel is classified into one of five categories based on the intensity of the pixel relative to neighboring pixels in the edge direction. Categories 1-4 each represent specific edge shapes as shown in FIG. 2B while category 0 is indicative that none of these edge shapes applies. Offsets for each of categories 1-4 are also computed after the pixels are classified.

More specifically, for each edge direction, a category number c for a pixel is computed as $c=\text{sign}(p0-p1)+\text{sign}(p0-p2)$ where $p0$ is the pixel and $p1$ and $p2$ are neighboring pixels as shown in FIG. 2A. The edge conditions that result in classifying a pixel into a category are shown in Table 1 and are also illustrated in FIG. 2B. After the pixels are classified, offsets are generated for each of categories 1-4. The offset for a category may be computed as an average of the differences between the original pixel values and the reconstructed pixel values of the pixels in the region classified into the category.

TABLE 1

| Category | Condition |
|---|---|
| 1 | p0 < p1 and p0 < p2 |
| 2 | (p0 < p1 and p0 = p2) or (p0 < p2 and p0 = p1) |
| 3 | (p0 > p1 and p0 = p2) or (p0 > p2 and p0 = p1) |
| 4 | p0 > p1 and p0 > p2 |
| 0 | none of above |

Once the partitioning of the LCUs into regions and the SAO filter type and offsets for each region are determined, the encoder applies the selected SAO offsets to the reconstructed picture according to the selected LCU partitioning and selected SAO filter types for each region in the partitioning. The offsets are applied as follows. If SO type 0 is selected for a region, no offset is applied. If one of SAO filter types 1-4 is selected for a region, for each pixel in the region, the category of the pixel (see Table 1) is determined as previously described and the offset for that category is added to the pixel. If the pixel is in category 0, no offset is added.

If one of the two BO SAO filter types, i.e., SAO filter types 5 and 6, is selected for a region, for each pixel in the region, the band of the pixel is determined as previously described. If the pixel is in one of the bands for the SAO filter type, i.e., one of the central bands for SAO filter type 5 or one of the side bands for SAO filter type 6, the offset for that band is added to the pixel; otherwise, the pixel is not changed.

Further, for each picture, the encoder signals SAO parameters such as the LCU region partitioning for SAO, the SAO filter type for each LCU region, and the offsets for each LCU region in the encoded bit stream. Table 2 shows the SAO filter types (sao_type_idx) and the number of SAO offsets (NumSaoCategory) that are signaled for each filter type. Note that as many as sixteen offsets may be signaled for a region. For SAO filter types 1-4, the four offsets are signaled in category order (see Table 1). For SAO filter types 5 and 6, the 16 offsets are signaled in band order (lowest to highest).

TABLE 2

| sao_type_idx | NumSaoCategory | Edge type |
|---|---|---|
| 0 | 0 | Not applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 16 | Central band |
| 6 | 16 | Side band |

In a decoder, the SAO parameters for a slice are decoded, and SAO filtering is applied according to the parameters. That is, the decoder applies SAO offsets to the LCUs in the slice according to the signaled region partitioning for the picture and the signaled SAO filter type and offsets for each of the regions. The offsets for a given region are applied in the same way as previously described for the encoder.

Figure 3:
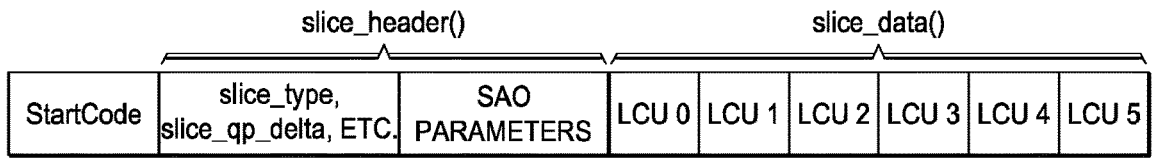
FIG. 3 is an example of prior art signaling of slice based SAO parameter signaling.

As illustrated in FIG. 3, the SAO parameters for LCUs in a picture are encoded in the slice header; thus, in a decoder, a delay in LCU processing is incurred as all data for SAO of LCUs in an entire picture has to be decoded and stored before processing of the LCU data in the slice data can begin. Moreover, the decoded SAO parameters for the entire picture have to be stored before LCU decoding is started, which may increase the memory requirements in a decoder. Encoding the SAO parameters in the slice header also causes a delay in processing in the encoder since the encoder cannot complete the SAO parameter portion of the slice header until after the SAO parameters for a picture are determined.

Figure 4:
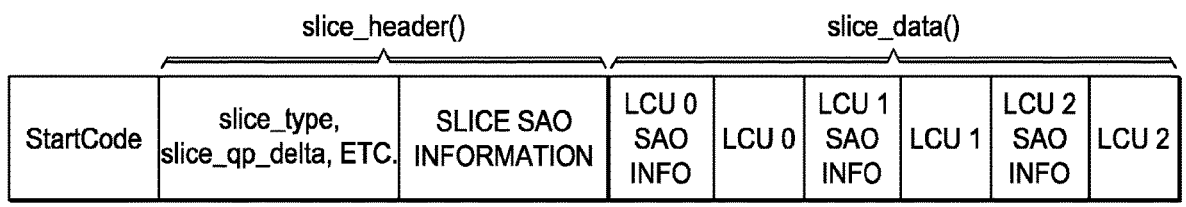
FIG. 4 is an example of largest coding unit (LCU) based SAO parameter signaling.

Embodiments of the invention provide alternative techniques for signaling of SAO parameters. In some embodiments, rather than signaling the SAO parameters on a slice basis, which requires signaling of the LCU region partition information for each picture, the needed SAO information is signaled for each LCU. This eliminates the need to signal the region partitioning of a picture. Further, as shown in the example of FIG. 4, the SAO information for each LCU is interleaved with the LCU data rather than being encoded in the slice header. In some embodiments, the SAO information for an LCU may immediately precede the LCU data in the encoded bit stream as shown in FIG. 4. In some embodiments, the SAO information may immediately follow the LCU data in the encoded bit stream.

Further, in some embodiments, rather than directly encoding the values of the LCU SAO parameters in the LCU SAO information in the bit stream, the values of some or all of the SAO parameters may be predicted according to an agreed upon prediction protocol between the encoder and the decoder and one or more prediction indicators encoded in the LCU SAO information in lieu of the actual values to reduce the number of bits to be encoded. In essence, depending on the prediction protocol, one or more prediction indicators indicate to the decoder how an actual parameter value (or more than one actual parameter value) is to be determined.

As used herein in describing various embodiments, the term "SAO parameters" refers to parameters of an SAO implementation that together indicate the type of filtering to be applied, i.e., BO or EO, the offset values to be used, and any other information needed in order to apply the offset values. SAO may be implemented in different ways and the number of parameters and the semantics of the parameters are defined by the implementation. For example, in the SAO previously described herein, the parameters are a filter type and the offset values for that filter type. Further, the semantics of the filter type parameter are such that edge direction is communicated for EO type filtering and the bands to which offsets are to be applied are communicated for BO type filtering (see Table 2). In addition, the semantics of the filter type parameter also communicate the number of offsets.

In another example, the parameters of the SAO in HEVC Draft 8 are as follows: 1) a filter type that is 0 if no SAO is to be applied, 1 for BO type filtering, and 2 for EO type filtering; 2) four offset values that are the absolute values of the actual offset values; 3) the signs of each non-zero offset value (for BO type filtering); 4) a band position (for BO type filtering) indicating the left-most band of four consecutive bands where the offsets are to be applied; and 5) an EO class (for EO type filtering) that indicates the edge direction (See Table 3). The signs for the offset values for EO type filtering are inferred from the category, i.e., plus for categories 1 and 2, and minus for categories 3 and 4.

TABLE 3

| EO Class | Edge Direction |
|---|---|
| 0 | 1D 0-degree edge offset |
| 1 | 1D 90-degree edge offset |
| 2 | 1D 135-degree edge offset |
| 3 | 1D 45-degree edge offset |

Unless otherwise explicitly stated herein, embodiments of the invention are not limited to any particular SAO parameter set/SAO implementation.

As used herein in describing various embodiments, the term "SAO information" refers to the data that is encoded in the video bit stream to communicate the SAO parameters to a decoder. The "SAO information" may be different in different embodiments. For example, SAO information may be the directly encoded SAO parameters, one or more prediction indicators, or a combination there of.

Figure 5:
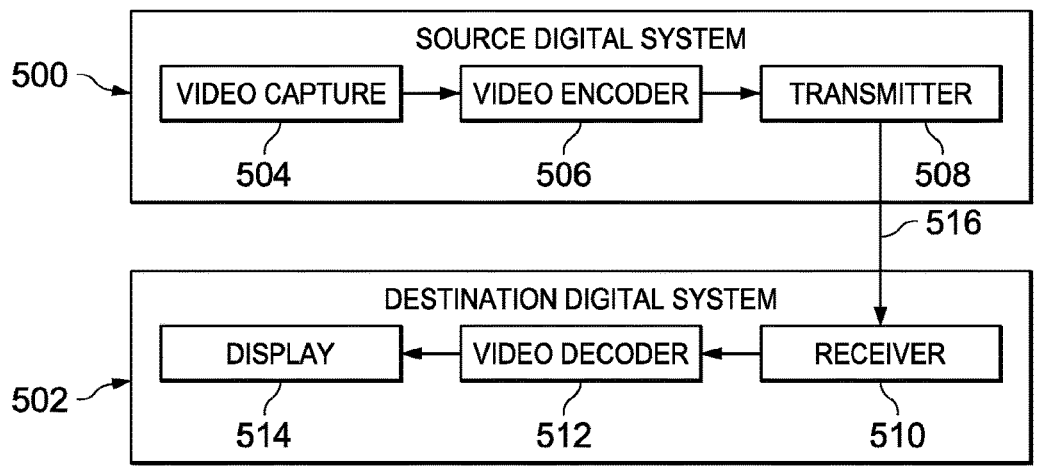
FIG. 5 is a block diagram of a digital system.

FIG. 5 shows a block diagram of a digital system that includes a source digital system 500 that transmits encoded video sequences to a destination digital system 502 via a communication channel 516. The source digital system 500 includes a video capture component 504, a video encoder component 506, and a transmitter component 508. The video capture component 504 is configured to provide a video sequence to be encoded by the video encoder component 506. The video capture component 504 may be, for example, a video camera, a video archive, or a video feed from a video content provider. In some embodiments, the video capture component 504 may generate computer graphics as the video sequence, or a combination of live video, archived video, and/or computer-generated video.

The video encoder component 506 receives a video sequence from the video capture component 504 and encodes it for transmission by the transmitter component 508. The video encoder component 506 receives the video sequence from the video capture component 504 as a sequence of pictures, divides the pictures into largest coding units (LCUs), and encodes the video data in the LCUs. The video encoder component 506 may be configured to perform SAO filtering and SAO parameter signaling during the encoding process as described herein. An embodiment of the video encoder component 506 is described in more detail herein in reference to FIG. 6.

The transmitter component 508 transmits the encoded video data to the destination digital system 502 via the communication channel 516. The communication channel 516 may be any communication medium, or combination of communication media suitable for transmission of the encoded video sequence, such as, for example, wired or wireless communication media, a local area network, or a wide area network.

The destination digital system 502 includes a receiver component 510, a video decoder component 512 and a display component 514. The receiver component 510 receives the encoded video data from the source digital system 500 via the communication channel 516 and provides the encoded video data to the video decoder component 512 for decoding. The video decoder component 512 reverses the encoding process performed by the video encoder component 506 to reconstruct the LCUs of the video sequence. The video decoder component 512 may be configured to perform SAO filtering during the decoding process as described herein. An embodiment of the video decoder component 512 is described in more detail below in reference to FIG. 8.

The reconstructed video sequence is displayed on the display component 514. The display component 514 may be any suitable display device such as, for example, a plasma display, a liquid crystal display (LCD), a light emitting diode (LED) display, etc.

In some embodiments, the source digital system 500 may also include a receiver component and a video decoder component and/or the destination digital system 502 may include a transmitter component and a video encoder component for transmission of video sequences both directions for video steaming, video broadcasting, and video telephony. Further, the video encoder component 506 and the video decoder component 512 may perform encoding and decoding in accordance with one or more video compression standards. The video encoder component 506 and the video decoder component 512 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 6:
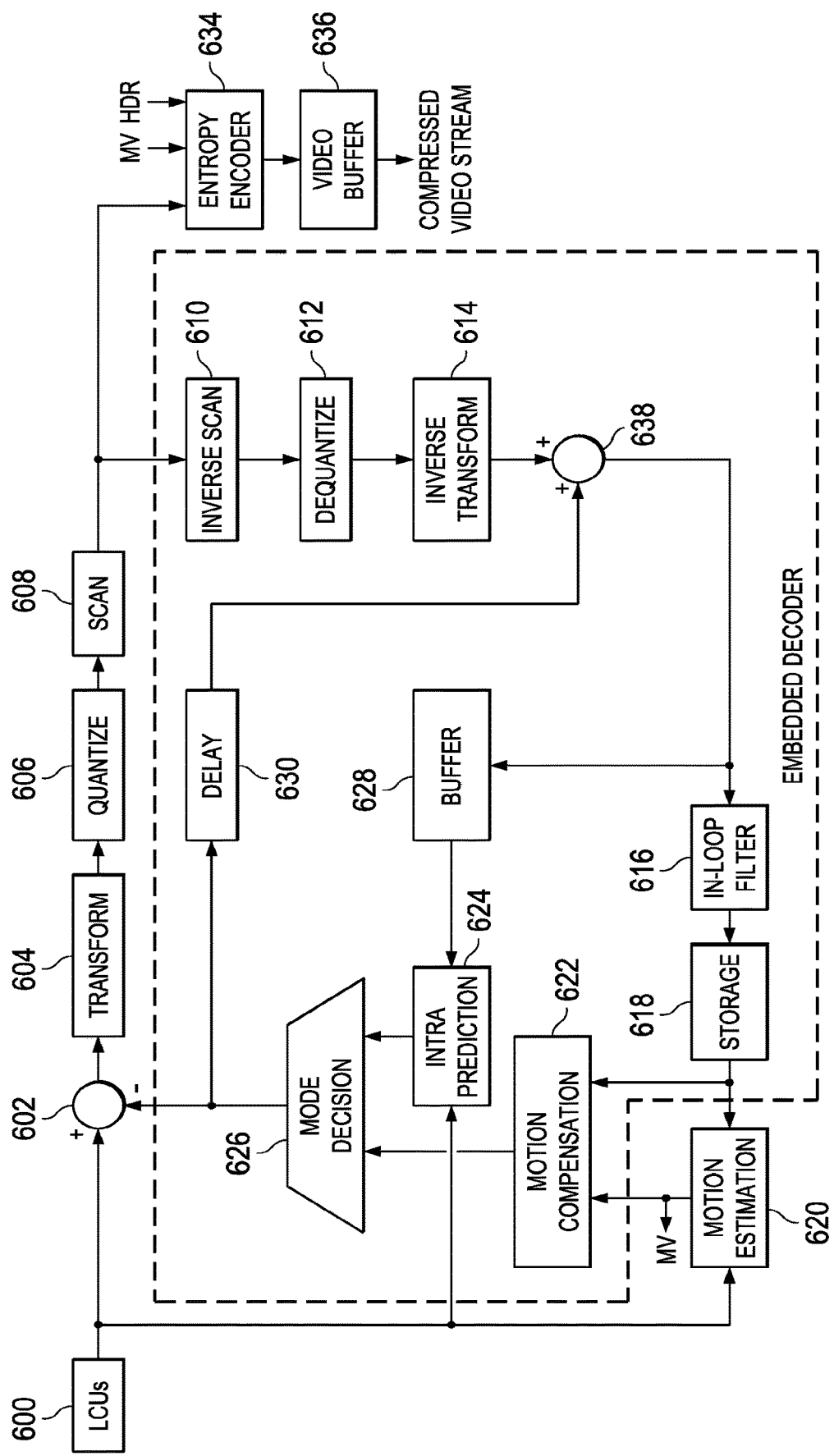
FIG. 6 is a block diagram of a video encoder.

FIG. 6 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs of the input video sequence from the coding control component and encodes the LCUs under the control of the coding control component to generate the compressed video stream. The LCUs in each picture are processed in row order. The CUs in the CU structure of an LCU may be processed by the LCU processing in a depth-first Z-scan order. The LCUs 600 from the coding control unit are provided as one input of a motion estimation component 620, as one input of an intra-prediction component 624, and to a positive input of a combiner 602 (e.g., adder or subtractor or the like). Further, although not specifically shown, the prediction mode of each picture as selected by the coding control component is provided to a mode selector component and the entropy encoder 634.

The storage component 618 provides reference data to the motion estimation component 620 and to the motion compensation component 622. The reference data may include one or more previously encoded and decoded pictures, i.e., reference pictures.

The motion estimation component 620 provides motion data information to the motion compensation component 622 and the entropy encoder 634. More specifically, the motion estimation component 620 performs tests on CUs in an LCU based on multiple inter-prediction modes (e.g., skip mode, merge mode, and normal or direct inter-prediction), PU sizes, and TU sizes using reference picture data from storage 618 to choose the best CU partitioning, PU/TU partitioning, inter-prediction modes, motion vectors, etc. based on a rate distortion coding cost. To perform the tests, the motion estimation component 620 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU.

The motion estimation component 620 provides the motion vector (MV) or vectors and the prediction mode for each PU in the selected CU partitioning to the motion compensation component 622 and the selected CU/PU/TU partitioning with corresponding motion vector(s), reference picture index (indices), and prediction direction(s) (if any) to the entropy encoder 634.

The motion compensation component 622 provides motion compensated inter-prediction information to the mode decision component 626 that includes motion compensated inter-predicted PUs, the selected inter-prediction modes for the inter-predicted PUs, and corresponding TU sizes for the selected CU partitioning. The coding costs of the inter-predicted CUs are also provided to the mode decision component 626.

The intra-prediction component 624 provides intra-prediction information to the mode decision component 626 and the entropy encoder 634. More specifically, the intra-prediction component 624 performs intra-prediction in which tests on CUs in an LCU based on multiple intra-prediction modes, PU sizes, and TU sizes are performed using reconstructed data from previously encoded neighboring CUs stored in the buffer 628 to choose the best CU partitioning, PU/TU partitioning, and intra-prediction modes based on a rate distortion coding cost. To perform the tests, the intra-prediction component 624 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction information provided to the mode decision component 626 includes the intra-predicted PUs, the selected intra-prediction modes for the PUs, and the corresponding TU sizes for the selected CU partitioning. The coding costs of the intra-predicted CUs are also provided to the mode decision component 626. The intra-prediction information provided to the entropy encoder 634 includes the selected CU/PU/TU partitioning with corresponding intra-prediction modes.

The mode decision component 626 selects between intra-prediction of a CU and inter-prediction of a CU based on the intra-prediction coding cost of the CU from the intra-prediction component 624, the inter-prediction coding cost of the CU from the inter-prediction component 620, and the picture prediction mode provided by the mode selector component. Based on the decision as to whether a CU is to be intra- or inter-coded, the intra-predicted PUs or inter-predicted PUs are selected, accordingly.

The output of the mode decision component 626, i.e., the predicted PUs, is provided to a negative input of the combiner 602 and to a delay component 630. The associated transform unit size is also provided to the transform component 604. The output of the delay component 630 is provided to another combiner (i.e., an adder) 638. The combiner 602 subtracts each predicted PU from the original PU to provide residual PUs to the transform component 604. Each resulting residual PU is a set of pixel difference values that quantify differences between pixel values of the original PU and the predicted PU. The residual blocks of all the PUs of a CU form a residual CU block for the transform component 604.

The transform component 604 performs block transforms on the residual CU to convert the residual pixel values to transform coefficients and provides the transform coefficients to a quantize component 606. More specifically, the transform component 604 receives the transform unit sizes for the residual CU and applies transforms of the specified sizes to the CU to generate transform coefficients.

The quantize component 606 quantizes the transform coefficients based on quantization parameters (QPs) and quantization matrices provided by the coding control component and the transform sizes. The quantized transform coefficients are taken out of their scan ordering by a scan component 608 and arranged sequentially for entropy coding. In essence, the coefficients are scanned backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 634.

The entropy encoder 634 entropy encodes the relevant data, i.e., syntax elements, output by the various encoding components and the coding control component to generate the compressed video bit stream that is provided to a video buffer 636 for transmission or storage. The syntax elements are encoded according to the syntactical order specified in HEVC. This syntactical order specifies the order in which syntax elements should occur in a compressed video bit stream. Among the syntax elements that are encoded are flags indicating the CU/PU/TU partitioning of an LCU, the prediction modes for the CUs, and the ordered quantized transform coefficients for the CUs. The entropy encoder 634 also codes relevant data from the in-loop filtering component 616 such as the LCU specific SAO information for each LCU. The LCU SAO information is signaled on an LCU-by-LCU basis rather than all together in slice headers as in the prior art. In some embodiments, the SAO information for an LCU may immediately precede the LCU data in the encoded bit stream as shown in FIG. 4. In some embodiments, the SAO information may immediately follow the LCU data in the encoded bit stream.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 608 are returned to their original post-transform arrangement by an inverse scan component 610, the output of which is provided to a dequantize component 612, which outputs a reconstructed version of the transform result from the transform component 604.

The dequantized transform coefficients are provided to the inverse transform component 614, which outputs estimated residual information representing a reconstructed version of a residual CU. The inverse transform component 614 receives the transform unit size used to generate the transform coefficients and applies inverse transform(s) of the specified size to the transform coefficients to reconstruct the residual values.

The reconstructed residual CU is provided to the combiner 638. The combiner 638 adds the delayed selected CU to the reconstructed residual CU to generate a reconstructed CU, which becomes part of reconstructed picture data. The reconstructed picture data is stored in a buffer 628 for use by the intra-prediction component 624 and is provided to an in-loop filter component 616.

Figure 7:
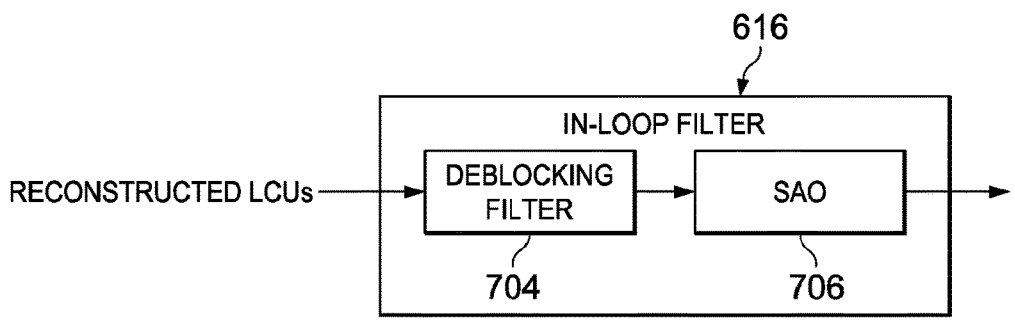
FIG. 7 is a block diagram of the in-loop filter component of the video encoder.

The in-loop filter component 616 applies various filters to the reconstructed picture data to improve the quality of the reference picture data used for encoding/decoding of subsequent pictures. FIG. 7 shows the in-loop filter component 616 in more detail. The filters in the in-loop filter component 616 include a deblocking filter 704 and a sample adaptive offset filter (SAO) 706. The in-loop filter component 616 may apply these filters, for example, on an LCU-by-LCU basis. The two filters may be applied sequentially as shown in FIG. 7. That is, the deblocking filter 704 may be first applied to the reconstructed data. Then, the SAO 706 may be applied to the deblocked reconstructed picture data. Referring again to FIG. 6, the final filtered reference picture data is provided to storage component 618.

The deblocking filter 704 operates to smooth discontinuities at block boundaries, i.e., TU and CU block boundaries, in a reconstructed picture. In general, for each LCU of the reconstructed picture, the SAO filter 706 determines the best offset values, i.e., band offset values or edge offset values, to be added to pixels of that LCU to compensate for intensity shift that may have occurred during the block based coding of the picture, applies the offset values to the reconstructed LCU, and determines the SAO information to be encoded in the bit stream for the LCU. The operation of embodiments of the SAO filter 706 of the in-loop filter component 616 is described in more detail herein in reference to the method of FIG. 10.

Figure 8:
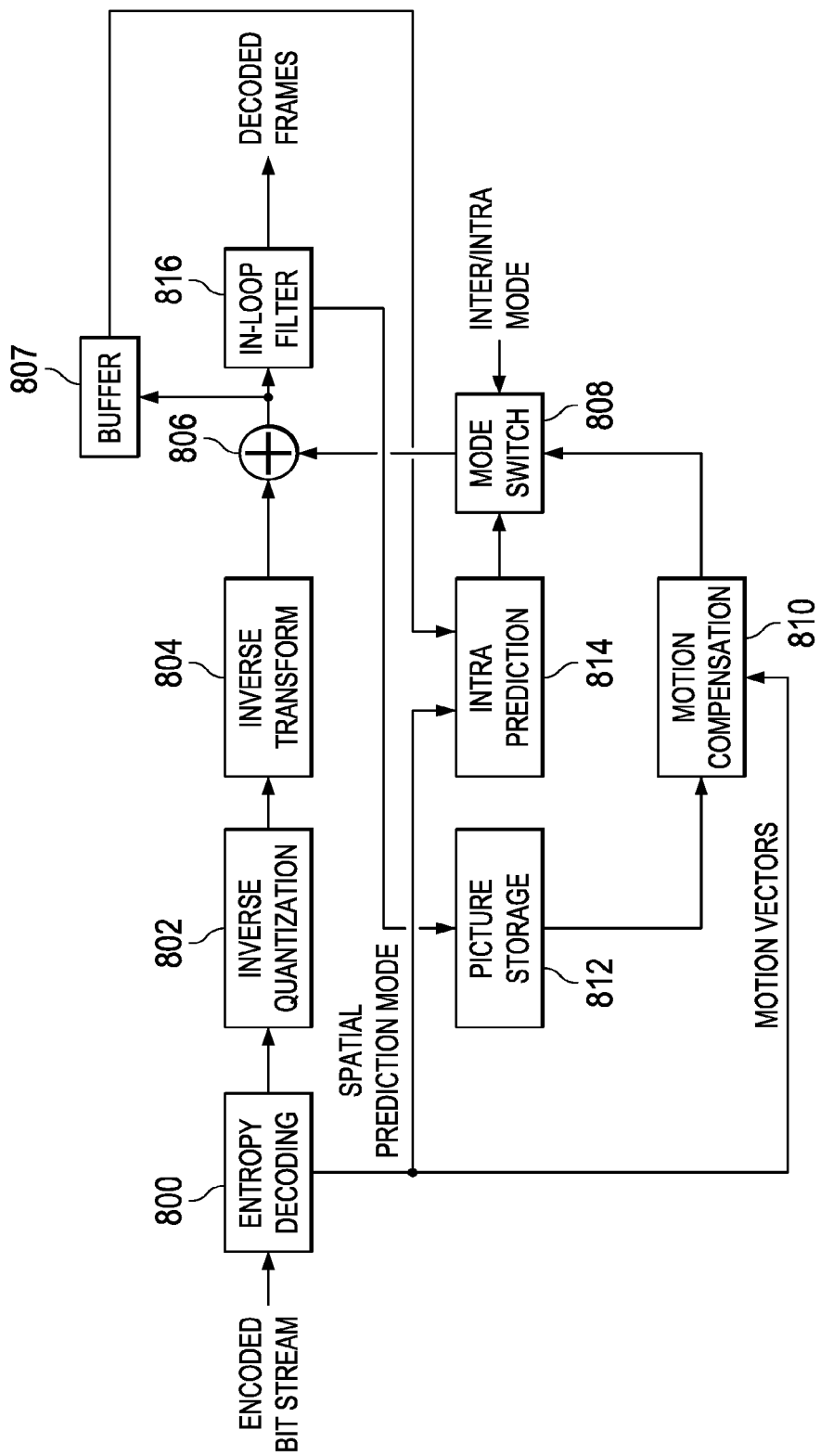
FIG. 8 is a block diagram of a video decoder.

FIG. 8 shows a block diagram of an example video decoder. The video decoder operates to reverse the encoding operations, i.e., entropy coding, quantization, transformation, and prediction, performed by the video encoder of FIG. 6 to regenerate the pictures of the original video sequence. In view of the above description of a video encoder, one of ordinary skill in the art will understand the functionality of components of the video decoder without detailed explanation.

The entropy decoding component 800 receives an entropy encoded (compressed) video bit stream and reverses the entropy coding to recover the encoded PUs and header information such as the prediction modes, the encoded CU and PU structures of the LCUs, and the LCU specific SAO information for each LCU. If the decoded prediction mode is an inter-prediction mode, the entropy decoder 800 then reconstructs the motion vector(s) as needed and provides the motion vector(s) to the motion compensation component 810.

The inverse quantization component 802 de-quantizes the quantized transform coefficients of the residual CU. The inverse transform component 804 transforms the frequency domain data from the inverse quantization component 802 back to the residual CU. That is, the inverse transform component 804 applies an inverse unit transform, i.e., the inverse of the unit transform used for encoding, to the de-quantized residual coefficients to produce the residual CUs.

A residual CU supplies one input of the addition component 806. The other input of the addition component 806 comes from the mode switch 808. When an inter-prediction mode is signaled in the encoded video stream, the mode switch 808 selects predicted PUs from the motion compensation component 810 and when an intra-prediction mode is signaled, the mode switch selects predicted PUs from the intra-prediction component 814.

The motion compensation component 810 receives reference data from storage 812 and applies the motion compensation computed by the encoder and transmitted in the encoded video bit stream to the reference data to generate a predicted PU. That is, the motion compensation component 810 uses the motion vector(s) from the entropy decoder 800 and the reference data to generate a predicted PU.

The intra-prediction component 814 receives reconstructed samples from previously reconstructed PUs of a current picture from the buffer 807 and performs the intra-prediction computed by the encoder as signaled by an intra-prediction mode transmitted in the encoded video bit stream using the reconstructed samples as needed to generate a predicted PU.

The addition component 806 generates a reconstructed CU by adding the predicted PUs selected by the mode switch 808 and the residual CU. The output of the addition component 806, i.e., the reconstructed CUs, supplies the input of the in-loop filter component 816 and is also stored in the buffer 807 for use by the intra-prediction component 814.

The in-loop filter component 816 applies the same filters to the reconstructed picture data as the encoder, i.e., a deblocking filter and SAO, in the same order to improve the quality of the reconstructed picture data. The output of the in-loop filter component 816 is the decoded pictures of the video bit stream. Further, the output of the in-loop filter component 816 is stored in storage 812 to be used as reference data by the motion compensation component 810.

Figure 9:
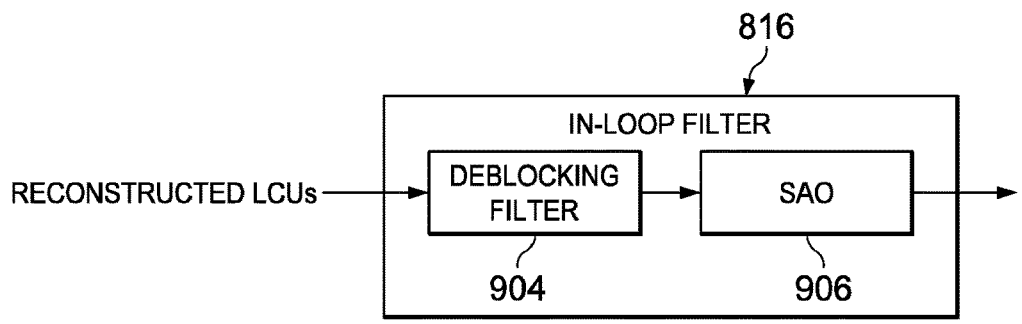
FIG. 9 is a block diagram of the in-loop filter component of the video decoder.

FIG. 9 shows the in-loop filter component 816 in more detail. The filters in the in-loop filter component 816 include a deblocking filter 904 and a sample adaptive offset filter (SAO) 906. The deblocking filter 904 operates in the same manner as the deblocking filter of the encoder. In general, for each reconstructed LCU, the SAO filter 906 applies the offset values determined by the encoder for the LCU to the pixels of the LCU. More specifically, the SAO filter 906 receives decoded LCU specific SAO information from the entropy decoding component 800 for each reconstructed LCU, determines the SAO parameters for the LCU from the SAO information, and applies the determined offset values to the pixels of the LCU according to values of other parameters in the SAO parameter set. The operation of embodiments of the SAO filter 906 of the in-loop filter component 816 for each LCU is described in more detail herein in reference to the method of FIG. 12.

Figure 10:
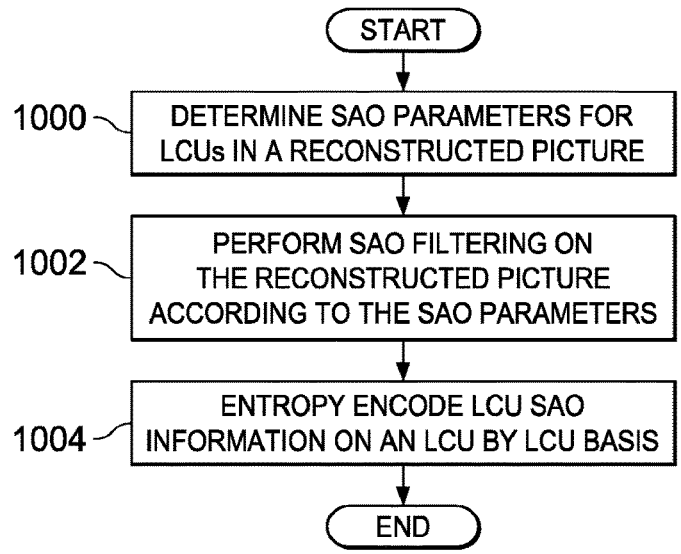
FIG. 10 is a flow diagram of a method for SAO signaling in an encoder.
Figure 11:
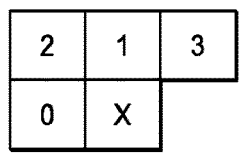
FIG. 11 is an example of spatially neighboring LCUs for SAO parameter prediction.

FIG. 10 is a flow diagram of a method for SAO filtering and SAO parameter signaling that may be performed in a video encoder, e.g., the encoder of FIG. 6. In general, in this method, SAO parameters are determined for each LCU in a picture, SAO filtering is performed on each LCU according to the SAO parameters determined for the LCU, and SAO information for each LCU is encoded in the bit stream interleaved with the LCU data. In an encoder, method steps 1000 and 1002 may be performed by an SAO filter, e.g., SAO 706 of FIG. 7, and method step 1004 may be performed by an entropy encoder, e.g., entropy encoder 634 of FIG. 6.

Referring now to FIG. 10, SAO parameters are determined 1000 for LCUs in a reconstructed picture (after a deblocking filter is applied). That is, SAO parameters are determined for each LCU in the reconstructed picture. Any suitable technique may be used for determining the LCU SAO parameters. For example, a region-based approach for determining SAO parameters that uses quadtree partitioning such as the one previously described herein may be used. In such an approach, the same SAO parameters are used for all LCUs in a region. In another example, a fixed picture partitioning that is LCU-aligned may be used in which SAO parameters are determined for each partition. The same SAO parameters would apply to all LCUs in a partition. In another example, SAO parameters may be determined individually for each LCU.

Once the SAO parameters for an LCU are determined, the SAO information to be encoded in the bit stream for that LCU is also determined. In some embodiments, the actual values of the SAO parameters determined for an LCU are the SAO information for the LCU. As is explained in more detail below, in some embodiments, a prediction protocol may be used to predict some or all of the SAO parameters for an LCU in order to reduce the size of the SAO information encoded in the bit stream. In such embodiments, the SAO information for an LCU is determined according to the prediction protocol.

SAO filtering is then performed 1002 on the reconstructed picture according to the SAO parameters determined for the LCUs. More specifically, SAO filtering is performed on each LCU according to the particular SAO parameters determined for that LCU. In general, the SAO filtering applies the specified offsets in the SAO parameters to pixels in the LCU according to the filter type indicated in the SAO parameters.

The LCU specific SAO information for each LCU is also entropy coded 1004 into the compressed bit stream on an LCU by LCU basis, i.e., the LCU specific SAO information is interleaved with the LCU data rather than being encoded in the slice header as in the prior art. In some embodiments, the SAO information for an LCU may immediately precede the LCU data in the encoded bit stream as shown in the example of FIG. 4. In some embodiments, the SAO information may immediately follow the LCU data in the encoded bit stream.

Direct encoding of the SAO parameters for each LCU may increase the encoded bit stream size over the prior art in which SAO parameters for regions were coded instead. To reduce the number of bits needed for encoding SAO parameters, rather than encoding the values of some or all of the LCU SAO parameters, in some embodiments of the method of FIG. 10, the values may be predicted according to an agreed upon prediction protocol between the encoder and the decoder and prediction indicators encoded in lieu of the actual values to reduce the number of bits to be encoded. In essence, depending on the prediction protocol, one or prediction indicators indicate to the decoder how an actual parameter value (or more than one actual parameter value) is to be determined.

In some embodiments, offset values are predicted based on previously encoded offset values and the differences (deltas) signaled as prediction indicators for the offset values. In such embodiments, the SAO information for an LCU includes the prediction indicators in lieu of the offset values. In some such embodiments, a prediction indicator for an offset value is the delta between the offset value and the previously encoded offset value. More specifically, the offset values for an LCU may be signaled in a known order. The actual value of the first offset value is encoded. The absolute value of this first offset value is then used as the predictor for the second offset value. The difference between the absolute value of the first offset value and the actual second offset value is determined, and this delta is encoded as the prediction indicator for the second offset value. The absolute value of this delta is then used as the predictor for the third offset value. The difference between the absolute value of the delta and the actual value of the third offset value is determined, and this delta is encoded as the prediction indicator for the third offset value. This process is repeated for each of the remaining offset values. For example, depending on the particular SAO implementation, there may be 16 SAO offsets to be signaled (see Table 2). The agreed upon order for signaling these offsets may be according to band order from lowest band number to highest band number. If the offsets are 2, 2, 4, 5, 6, 6, 7, 7, 3, 12, 2, 2, 3, 6, 6, 7, these offset values would be signaled as deltas (prediction indicators) 2, 0, 2, 1, 1, 0, 1, 0, −4, 9, 10, 0, 1, 3, 0, 1.

In some embodiments, a prediction protocol for LCU SAO parameters may be used in which an LCU is "merged" with a neighboring LCU in the same slice, i.e., a spatially neighboring LCU, such that the LCU shares the SAO parameters of the neighboring LCU. In general, the SAO parameters of the neighboring LCU serve as the predictors for the SAO parameters of the LCU if the SAO parameters of the LCU and the neighboring LCU are the same. In such a prediction protocol, a merge indicator, e.g., a merge flag, is encoded for each LCU to indicate whether or not merging is used. If merging is used, the SAO parameters of the LCU are not encoded. If merging is not used, the actual SAO parameters of the LCU are encoded in addition to the merge indicator.

Different schemes may be used to identify a neighboring LCU for possible merging. For example, in some embodiments, a single neighboring LCU, e.g., the immediate left neighboring LCU or the immediate top neighboring LCU, may be considered for merging with the current LCU. If the SAO parameters of the current LCU and the single neighboring LCU are the same, the merge indicator is set to indicate merging of the current LCU and is encoded in the bit stream. The actual SAO parameters for the current LCU need not be signaled as the decoder can use the SAO parameters of the neighboring LCU. If the SAO parameters of the current LCU and the single neighboring LCU are not the same or the neighboring LCU is not available, e.g., the current LCU is at a left or top slice boundary, the merge indicator is set to indicate no merging and the merge indicator and the other SAO parameters of the current LCU are encoded in the bit stream.

In some embodiments, multiple spatially neighboring LCUs, i.e., two or more neighboring LCUs, may be considered for merging with the current LCU. In such embodiments, the SAO parameters of the current LCU are compared to the SAO parameters of each of the spatially neighboring LCU candidates (if available) in a specified order, and the first neighboring LCU with matching parameters, if any, is selected for merging with the current LCU. If a match is found, an identifier for the selected neighboring LCU, e.g., an index, is encoded in the bit stream along with the merge indicator set to indicate merging. If no match is found, a merge indicator set to indicate no merging is encoded in the bit stream along with the other SAO parameters of the current LCU.

For example, in some embodiments, the four spatially neighboring LCUs indicated in FIG. 5 may be considered for merging with the current LCU. In this figure, the X denotes the current LCU and the numbered blocks are the spatially neighboring LCUs to be considered. Note that depending on the location of the current LCU in the slice, one or more of these spatially neighboring LCUs may not be available. For example, if the current LCU is at the left boundary of the slice, neighboring LCU 0 and neighboring LCU 2 will not be available to be considered for merging with the current LCU. The number inside each block indicates the order in which the neighboring LCUs are to be considered for merging with the current LCU. This number also serves as an index to identify the neighboring LCU to the decoder if that LCU is selected for merging. In some embodiments, a subset of these spatially neighboring LCUs may be used. For example, only LCU 0 (the immediate left neighboring LCU) and LCU 1 (the immediate top neighboring LCU) may be considered for merging.

In some embodiments, a prediction protocol for LCU SAO parameters may be used in which an LCU is "merged" with a temporally co-located LCU such that the LCU shares the SAO parameters of the co-located LCU. In general, a co-located LCU or temporally co-located LCU is a square area in a reference picture having the same coordinates, size, and shape of an LCU in a picture currently being encoded or decoded. For purposes of merging, the temporally co-located LCU for a current LCU is a square area in a reference picture having the same coordinates, size, and shape of the current LCU. If the SAO parameters of the current LCU and the co-located LCU are the same, the merge indicator is set to indicate merging of the current LCU and is encoded in the bit stream. The actual SAO parameters for the current LCU need not be signaled as the decoder can use the SAO parameters of the co-located LCU. If the SAO parameters of the current LCU and the co-located LCU are not the same or the co-located LCU is not available, the merge indicator is set to indicate no merging and the merge indicator and the other SAO parameters of the current LCU are encoded in the bit stream.

In some embodiments, a prediction protocol for LCU SAO parameters may be used in which multiple spatially neighboring LCUS and the co-located LCU are considered for merging with the current LCU. In some such embodiments, the SAO parameters of the current LCU are compared to the SAO parameters of each of the spatially neighboring LCU candidates and the co-located LCU (if available) in a specified order, and the first LCU candidate with matching parameters, if any, is selected for merging with the current LCU. If a match is found, an identifier for the selected candidate LCU, e.g., an index, is encoded in the bit stream along with the merge indicator set to indicate merging. If no match is found, a merge indicator set to indicate no merging is encoded in the bit stream along with the other SAO parameters of the current LCU.

For example, in some embodiments, the spatially neighboring LCUs may be the LCUs indicated in FIG. 5 with the ordering as indicated in FIG. 5 and the co-located LCU may be assigned an index of 4, making it the last LCU to be considered. An SAO merge candidate list is constructed by considering each of the five candidate LCUs in the order specified. If a candidate LCU is available, it is added as the next entry in the SAO merge candidate list. Thus, if all five candidate LCUs are available, the ordered candidate LCUs in the SAO merge list will be LCU 0, LCU 1 LCU 2, LCU 3, and the temporally co-located LCU, LCU 4. If, for example, LCU 0 and LCU 2 are not available, the ordered candidate LCUs in the SAO merge list will be LCU 1, LCU 3, and LCU 4.

The SAO parameters are then compared to the SAO parameters of each candidate LCU in the SAO merge candidate list in order. The first candidate LCU in the list having the same SAO parameters, if any, is selected for merging with the current LCU. If a match is found, an identifier for the selected LCU candidate, e.g., the index of the location of the selected LCU candidate in the SAO merge candidate list, is encoded in the bit stream along with the merge indicator set to indicate merging. If no match is found, a merge indicator set to indicate no merging is encoded in the bit stream along with the SAO parameters of the current LCU. In some embodiments, if only one of the candidate LCUs was available, i.e., only one candidate LCU was in the constructed SAO merge candidate list, and the SAO parameters matched, the LCU candidate identifier is not encoded in the bit stream, i.e., only a merge indicator set to indicate merging is encoded.

In some embodiments, a prediction protocol for LCU SAO parameters may be used in which the parameters of multiple reference LCUs are combined to predict the SAO parameters of the current LCU. The reference LCUs may be spatially neighboring LCUs or may be spatially neighboring LCUs and the temporally co-located LCU. On the encoder side, an SAO filter type for the current LCU is selected as the one occurring most frequently in the parameters of the reference LCUs. If two or more filter types occur with the same frequency, the one with the smaller filter type index is chosen. The value of each offset for the current LCU is then computed as the average value of that offset in each of the reference LCUs having the filter type selected. The encoder then uses some criteria, e.g., coding cost, to decide whether these predicted parameters or the actual SAO parameters of the LCU should be used. If the predicted parameters are chosen, the merge indicator is set to indicate merging and is encoded in the bit stream. If the actual SAO parameters are chosen, the merge indicator is set to indicate no merging and is encoded in the bit stream along with the actual SAO parameters. In addition, the predicted parameters would be used to apply SAO filtering to the LCU in the encoder rather than the actual SAO parameters Note that on the decoder side, if merging is indicated, the decoder would repeat the process used in the encoder to determine the predicted parameters.

Figure 12:
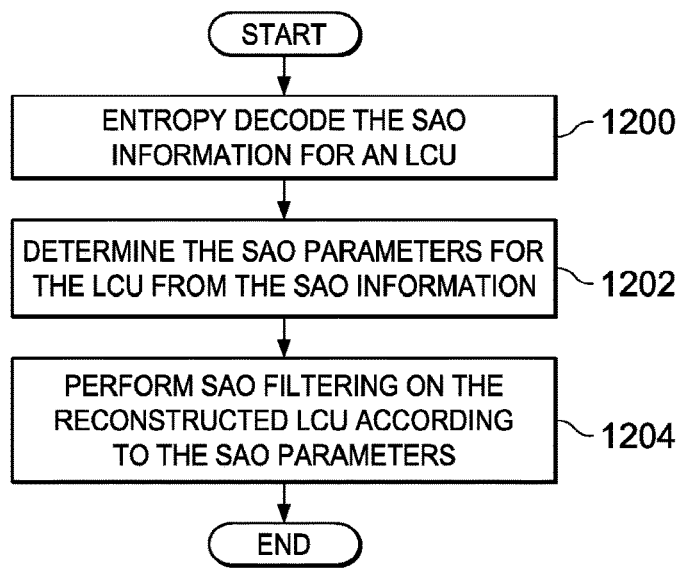
FIG. 12 is a flow diagram of a method for SAO filtering in a decoder.

FIG. 12 is a flow diagram of a method for SAO filtering that may be performed in a video decoder, e.g., the decoder of FIG. 8. In general, in this method, the SAO information for an LCU encoded in a compressed video bit stream as per an embodiment of the method of FIG. 10 is entropy decoded, the SAO parameters for the LCU are determined from the decoded SAO information, and SAO filtering is performed on the reconstructed LCU according to the determined SAO parameters. In a video decoder, method steps 1202 and 1204 may be performed by an SAO filter, e.g., SAO 906 of FIG. 9, and method step 11200 may be performed by an entropy decoder, e.g., entropy decoder 800 of FIG. 8.

Referring now to FIG. 12, initially the SAO information for an LCU is entropy decoded 1200. In some embodiments, the SAO information for the LCU is the actual values of the SAO parameters determined for the LCU by the encoder. In some embodiments, the content of the SAO information for the LCU corresponds to a prediction protocol used by the encoder to predict some or all of the SAO parameters for the LCU.

The SAO parameters for the LCU are then determined 1202 from the SAO information. In embodiments in which the SAO information is the directly coded actual values of the SAO parameters for the LCU, determination of the SAO parameter values is simple. In embodiments where the SAO information for the LCU corresponds to a prediction protocol, the decoded SAO information is further analyzed according to the prediction protocol to determine the SAO parameters. Given the benefit of the foregoing description of prediction protocols that may be used in embodiments of the encoding method of FIG. 10, one of ordinary skill in the art will understand how the SAO parameters may be determined using the decoded SAO information when these prediction protocols are used in encoding without need for further written description.

SAO filtering is then performed on the reconstructed LCU according to the determined SAO parameters. In general, the SAO filtering applies the specified offsets in the SAO parameters to pixels in the LCU according to the filter type indicated in the SAO parameters.

As is well known, a picture may include more than one color component. The aforementioned SAO information and SAO parameters can be shared among multiple color components. Or, alternatively, SAO parameters and SAO information may be used for each color component. In such cases, the SAO parameters and SAO information for each color component may be determined and signaled according to embodiments described herein. In embodiments using one of the merging forms of prediction is used, a merge indicator may be signaled for each color component or a common merge indicator may be signaled for all color component. For example, one of the commonly used color formats is YCbCr. If the SAO parameters of Y, Cb, and Cr of the current LCU can be predicted by the SAO parameters of Y, Cb, and Cr in another LCU (as determined by the particular prediction protocol), then a single merge indicator set to indicate merging is encoded in the bit stream. Otherwise, a single merge indicator set to indicate no merging is encoded in the bit stream as well as the SAO parameter set for Y and the SAO parameter set for Cb and Cr.

FIG. 13 is a block diagram of an example digital system suitable for use as an embedded system that may be configured to perform SAO filtering and SAO parameter signaling as described herein during encoding of a video stream and/or SAO filtering during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1300 is a programmable platform designed to meet the processing needs of applications such as video encode/decode/transcode/transrate, video surveillance, video conferencing, set-top box, medical imaging, media server, gaming, digital signage, etc. The SoC 1300 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1300 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1300, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1300 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 13, the SoC 1300 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1300 may be configured to perform SAO filtering and SAO parameter signaling during video encoding and/or SAO filtering during decoding of an encoded video bitstream using methods described herein. For example, the coding control of the video encoder of FIG. 6 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. At least some of the computational operations of the SAO filtering and SAO parameter signaling during encoding of a video stream may also be executed on the HDVICP coprocessors. Similarly, at least some of the computational operations of the various components of the video decoder of FIG. 8, including entropy decoding, inverse quantization, inverse transformation, intra-prediction, and motion compensation may be executed on the HDVICP coprocessors. Further, at least some of the computational operations of the SAO filtering during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, in some of the SAO prediction protocols described herein, the criteria for selecting the SAO parameters of another LCU as predictors for the current LCU is that the parameters of the two LCUs are the same. One of ordinary skill in the art will understand other embodiments in which criteria other than an exact match are used to decide if the SAO parameters of another LCU are to be used as predictors. For example, the encoder could compute coding costs of using the SAO parameters of the neighboring LCUs and/or co-located LCU for the current LCU and choose the parameters with the best coding cost as the predictors.

In another example, particular SAO filter types, edge directions, pixel categories, numbers of offset values, etc., drawn from versions of the emerging HEVC standard have been described above. One of ordinary skill in the art will understand embodiments in which the SAO filter types, edge directions, pixel categories, number of offset values, and/or other specific details of SAO filtering differ from the ones described.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A system for video processing, the system comprising:
an entropy decoder component configured to decode an entropy encoded bit stream;
an inverse quantization component coupled to the entropy decoder component and configured to perform an inverse quantization function on at least a portion of the decoded bit stream;
an inverse transform component coupled to the inverse quantization component and configured to perform an inverse transform on bit stream data output from the inverse quantization component;
a combiner component coupled to the inverse transform component and configured to combine bit stream data output from the inverse transform component with additional data to form non-overlapping regions of a reconstructed picture;
a deblocking filter component coupled to the combiner component, the deblocking filter component configured to perform deblocking filtering on the non-overlapping regions of the reconstructed picture; and
a SAO filter component coupled to the deblocking filter component and configured to:
perform SAO filtering on the deblocked non-overlapping regions of the reconstructed picture using SAO parameters extracted from decoded slice data, wherein the SAO parameters for the deblocked non-overlapping regions and data for the deblocked non-overlapping regions are interleaved in the decoded slice data of the decoded bit stream; and
apply SAO parameters extracted for an immediate left nearest neighbor non-overlapping region to a first non-overlapping region or SAO parameters for extracted for an immediate top nearest neighbor non-overlapping region to a second non-overlapping region when a first merge flag from the decoded slice data is set.

2. The system of claim 1 wherein the system comprises multiple processing units with a memory on a common integrated circuit.

3. The system of claim 2 wherein said multiple processing units further comprises at least a first processing unit for controlling video processes and at least a second processing unit wherein at least some of the SAO filtering is performed on the second processing unit.

4. The system of claim 2 further comprising software to be executed by at least some of the multiple processing units during video processes wherein the software is initially stored in a computer-readable medium and loaded and executed in the at least some of the multiple processing units.

5. A system for sample adaptive offset (SAO) filtering, the system comprising:
a receiver component configured to receive encoded video data from a communications channel;
a decoder component coupled to the receiver component, the decoder component further comprising:
an entropy decoder component configured to decode an entropy encoded bit stream;
an inverse quantization component coupled to the entropy decoder component and configured to perform an inverse quantization function on at least a portion of the decoded bit stream;
an inverse transform component coupled to the inverse quantization component and configured to perform an inverse transform on bit stream data output from the inverse quantization component;

a combiner component coupled to the inverse transform component and configured to combine bit stream data output from the inverse transform component with additional data to form non-overlapping regions of a reconstructed picture;

a deblocking filter component coupled to the combiner component, the deblocking filter component configured to perform deblocking filtering on the non-overlapping regions of the reconstructed picture; and a SAO filter component coupled to the deblocking filter component and configured to:
  perform SAO filtering on the non-overlapping regions of the reconstructed picture using SAO parameters extracted from decoded slice data, wherein the SAO parameters for the non-overlapping regions and data for the non-overlapping regions are interleaved in the decoded slice data of the decoded bit stream; and
  apply SAO parameters extracted for an immediate left nearest neighbor non-overlapping region to a first non-overlapping region or SAO parameters extracted for an immediate top nearest neighbor non-overlapping region to a second non-overlapping region when a first merge flag from the decoded slice data is set; and a display component coupled to the decoder component and configured to display an SAO filtered reconstructed picture.

6. The system of claim 5 wherein the decoder component is configured from a system comprising multiple processing units with a memory on a common integrated circuit.

7. The system of claim 6 wherein said multiple processing units further comprises at least a first processing unit for controlling video processes and at least a second processing unit wherein at least some of the SAO filtering is performed on the second processing unit.

8. The system of claim 6 further comprising software to be executed by at least some of the multiple processing units during video processes wherein the software is initially stored in a computer-readable medium and loaded and executed in the at least some of the multiple processing units.

9. The system of claim 8, wherein the SAO filter type is a band offset filter or an edge filter.

10. The system of claim 9 where the communication channel is a wireless or wired communication medium.

11. A system for sample adaptive offset (SAO) filtering, the system comprising:
  a receiver component configured to receive encoded video data;
  a decoder component coupled to the receiver component, the decoder component comprising:
    an entropy decoder component configured to decode an entropy encoded bit stream;
    an inverse quantization component coupled to the entropy decoder component and configured to perform an inverse quantization function on at least a portion of the decoded bit stream;
    an inverse transform component coupled to the inverse quantization component and configured to perform an inverse transform on bit stream data output from the inverse quantization component;
    a combiner component coupled to the inverse transform component and configured to combine bit stream data output from the inverse transform component with additional data to form non-overlapping regions of a reconstructed picture;
    a deblocking filter component coupled to the combiner component, the deblocking filter component configured to perform deblocking filtering on the non-overlapping regions of the reconstructed picture; and
    a SAO filter component coupled to the deblocking filter component and configured to:
      perform SAO filtering on the non-overlapping regions of the reconstructed picture using SAO parameters extracted from decoded slice data, wherein the SAO parameters for the non-overlapping regions and data for the non-overlapping regions are interleaved in the decoded slice data of the decoded bit stream; and
      apply SAO parameters extracted for an immediate left nearest neighbor non-overlapping region to a first non-overlapping region or SAO parameters extracted for an immediate top nearest neighbor non-overlapping region to a second non-overlapping region when a first merge flag from the decoded slice data is set, wherein the decoder component comprises multiple processing units with a memory on a common integrated circuit; and
  a display component coupled to the decoder component and configured to display an SAO filtered reconstructed picture.

12. The system of claim 11 further comprising software to be executed by at least some of the multiple processing units during video processes wherein the software is initially stored in a computer-readable medium and loaded and executed in the at least some of the multiple processing units.

13. The system of claim 12, wherein the SAO filter type is a band offset filter or an edge filter.

* * * * *